United States Patent
Seifert

(10) Patent No.: US 8,182,629 B2
(45) Date of Patent: May 22, 2012

(54) METHOD FOR ORIENTING AND LABELING CONTAINERS HAVING AT LEAST ONE EAR

(76) Inventor: Larry A. Seifert, Perrysburg, OH (US)

( * ) Notice: Subject to any disclaimer, the term of this patent is extended or adjusted under 35 U.S.C. 154(b) by 330 days.

(21) Appl. No.: 11/818,009

(22) Filed: Jun. 13, 2007

(65) Prior Publication Data

US 2008/0000582 A1    Jan. 3, 2008

Related U.S. Application Data

(60) Provisional application No. 60/813,404, filed on Jun. 13, 2006.

(51) Int. Cl.
*B29C 51/16* (2006.01)
(52) U.S. Cl. .............. 156/212; 156/567; 198/481.1
(58) Field of Classification Search ............... 198/379, 198/480.1, 481, 1
See application file for complete search history.

(56) References Cited

U.S. PATENT DOCUMENTS

| | | | |
|---|---|---|---|
| 2,796,193 A * | 6/1957 | Rhodes | 220/769 |
| 2,880,845 A * | 4/1959 | Carter | 198/394 |
| 3,209,512 A | 10/1965 | Ferguson et al. | |
| 3,241,578 A | 3/1966 | Heisler | |
| 3,289,810 A | 12/1966 | Iannucci | |
| 3,462,912 A | 8/1969 | Anderson | |
| 3,848,394 A | 11/1974 | Heisler | |
| 4,280,612 A * | 7/1981 | Nagano | 198/379 |
| 4,344,522 A | 8/1982 | Heisler | |
| 4,383,601 A | 5/1983 | Heisler | |
| 5,137,136 A * | 8/1992 | Humele | 198/379 |
| 5,224,586 A * | 7/1993 | Naka et al. | 198/803.11 |
| 5,415,268 A * | 5/1995 | Lofgren | 198/394 |
| 5,709,770 A * | 1/1998 | Asghar et al. | 156/447 |
| 6,451,154 B1 * | 9/2002 | Grabau et al. | 156/300 |
| 6,652,936 B1 * | 11/2003 | Bright et al. | 428/34.9 |

* cited by examiner

*Primary Examiner* — John L. Goff
*Assistant Examiner* — Barbara J. Musser
(74) *Attorney, Agent, or Firm* — David C. Purdue

(57) ABSTRACT

Apparatus for orienting containers which have at least one ear on a side of the container is disclosed. Such apparatus is especially suited for use in combination with labeling equipment for applying a label to the oriented container so that at least one opening in a label registers with the at least one ear on the container. The apparatus comprises a star wheel with pockets which permit relatively free rotation of containers positioned within the pockets, an ear bump associated with each pocket in the star wheel and a releasable container hold down to prevent containers in the star wheel pockets from tilting while they are being oriented.

6 Claims, 3 Drawing Sheets

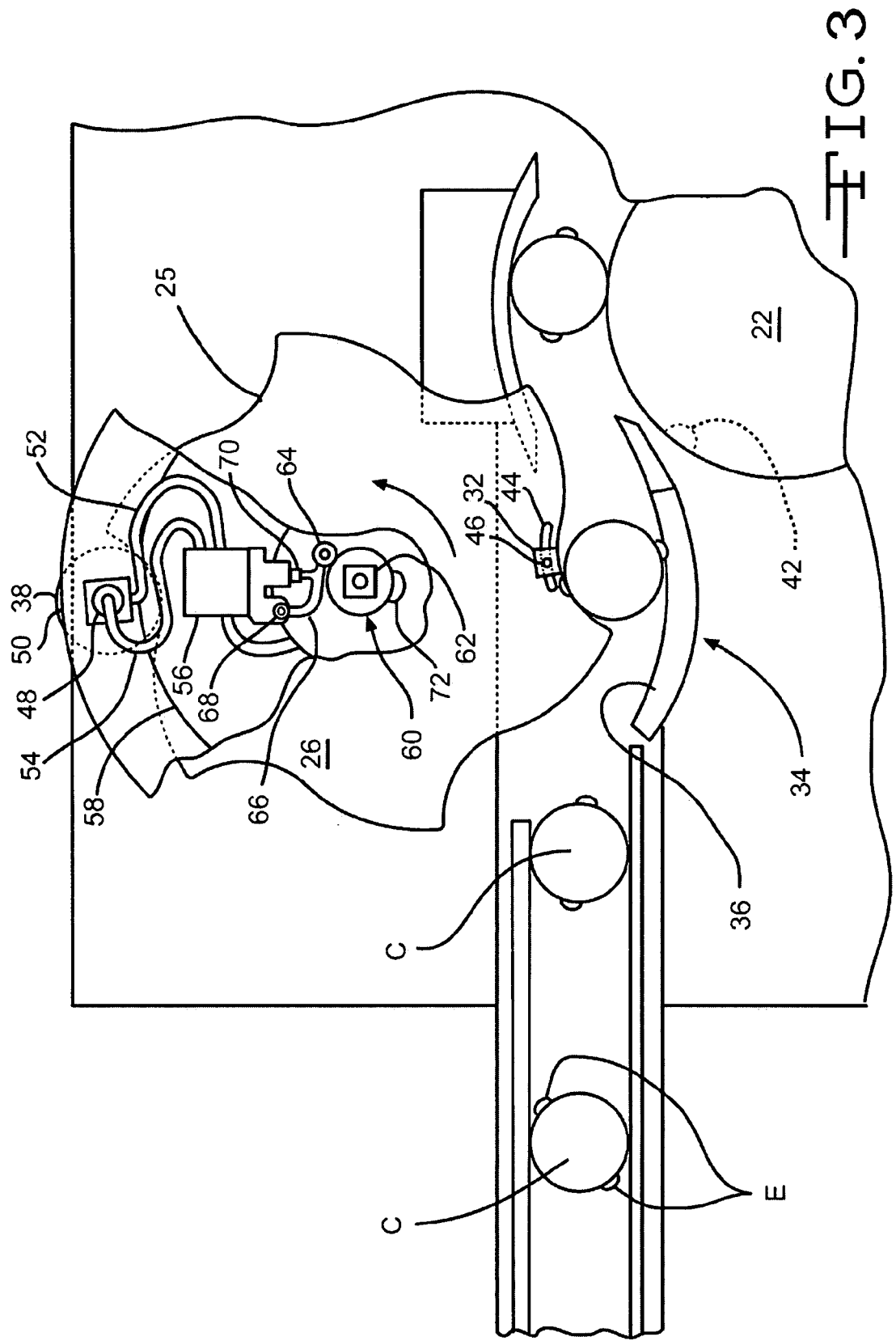

METHOD FOR ORIENTING AND LABELING CONTAINERS HAVING AT LEAST ONE EAR

BACKGROUND OF THE INVENTION

1. Field of the Invention

The present invention relates generally to the field of apparatus for orienting containers, especially prior to the application of labels to the containers. More specifically, the invention relates to an in-line apparatus for rotating a container and for stopping the container from rotating when an ear or other protrusion on the can reaches a specific, pre-selected angular orientation. This apparatus is especially useful in connection with labeling equipment for such containers where it is desired to orient the container relative to a label so that the ear or other protrusion registers with a corresponding opening in the label.

2. Description of the Prior Art

The art of labeling equipment is highly developed and the patent literature includes many patents directed to virtually every facet of labeling apparatus and methods. In a patent search directed to the present invention, the following US patents were identified: U.S. Pat. No. 3,241,578 (Heisler '578); U.S. Pat. No. 3,848,394 (Heisler '394); U.S. Pat. No. 4,344,522 (Heisler '522); U.S. Pat. No. 4,383,601 (Heisler '601); U.S. Pat. No. 3,209,512 (Ferguson); U.S. Pat. No. 3,289,810 (Iannucci) and U.S. Pat. No. 3,462,912 (Anderson).

SUMMARY OF THE INVENTION

The present invention is concerned with apparatus for orienting containers which have at least one ear on a side of the container. In particular, the invention is concerned with such apparatus preferably in combination with labeling equipment for applying a label to the oriented container so that an opening in a label registers with the at least one ear on the container.

Apparatus according to the preferred embodiment of the invention comprises a star wheel with pockets which permit relatively free rotation of containers positioned within the pockets, an ear bump associated with each pocket in the star wheel and a releasable container hold down to prevent containers in the star wheel pockets from tilting while they are being oriented. The apparatus can further comprise a labeling station for applying labels to the containers when they have been oriented so that at least one opening in the label registers with the at least one ear on each container.

Accordingly, it is an object of the present invention to provide an apparatus which is capable of consistently orienting containers relative to at least one ear on each container, prior to the application thereto of a label.

It is a further object of the invention to provide such an apparatus which can be incorporated into existing labeling stations with a minimum amount of disruption to the components of the labeler.

It is yet another object of the invention to provide such an apparatus which is especially suited to containers with a pair of ears for supporting a bail handle, for example.

These and other objects and advantages of the present invention will no doubt become apparent to those skilled in the art after having read this detailed description of the invention including the following description of the preferred embodiment which is illustrated by the various drawing figures.

BRIEF DESCRIPTION OF THE DRAWINGS

FIG. 3 is a view of the star wheel portion of the station showing portions of container retainer devices.

DETAILED DESCRIPTION OF THE PREFERRED EMBODIMENT

Figure 1:
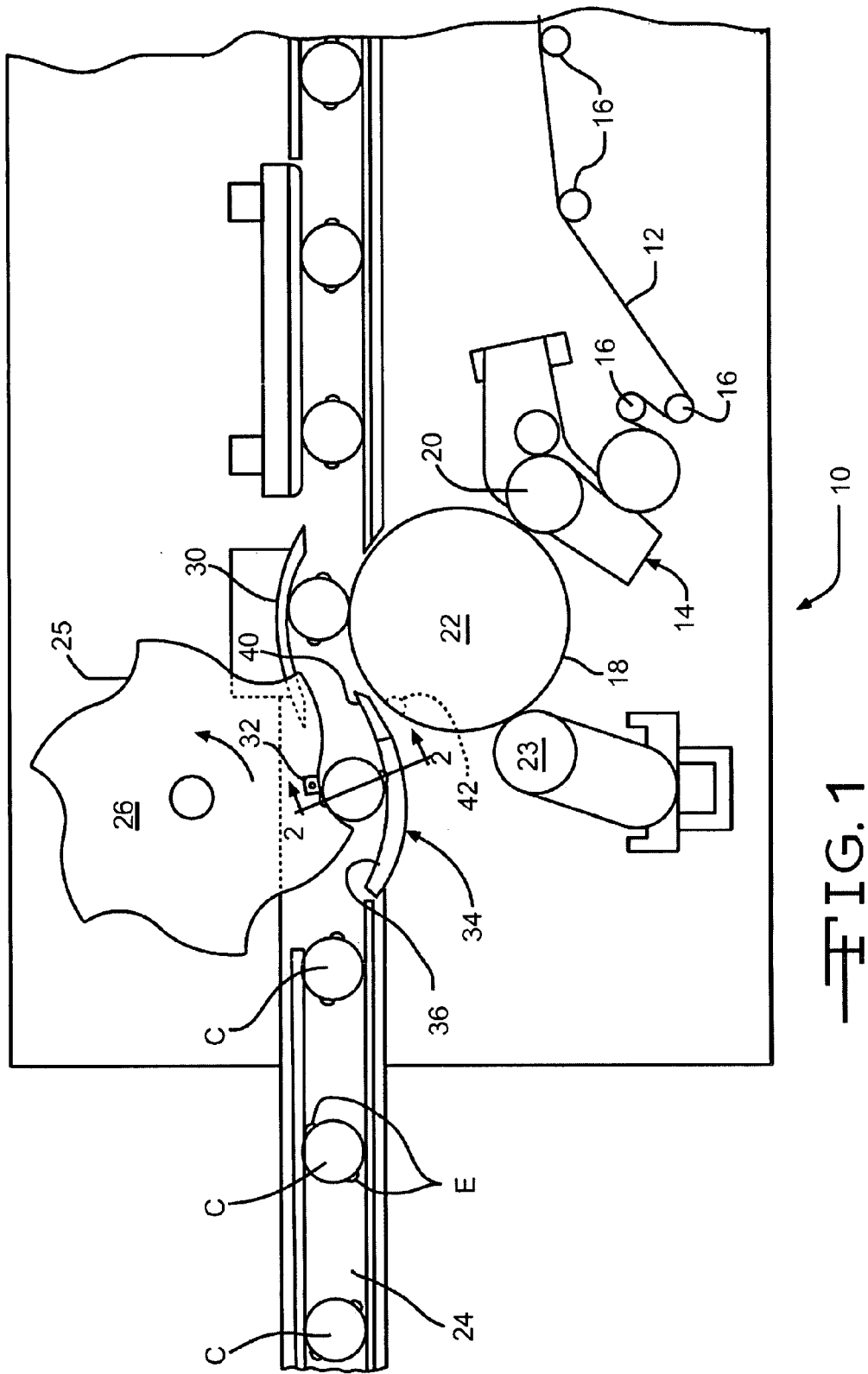
FIG. 1 is a top view of container orienting and labeling apparatus according to the present invention.
Figure 2:
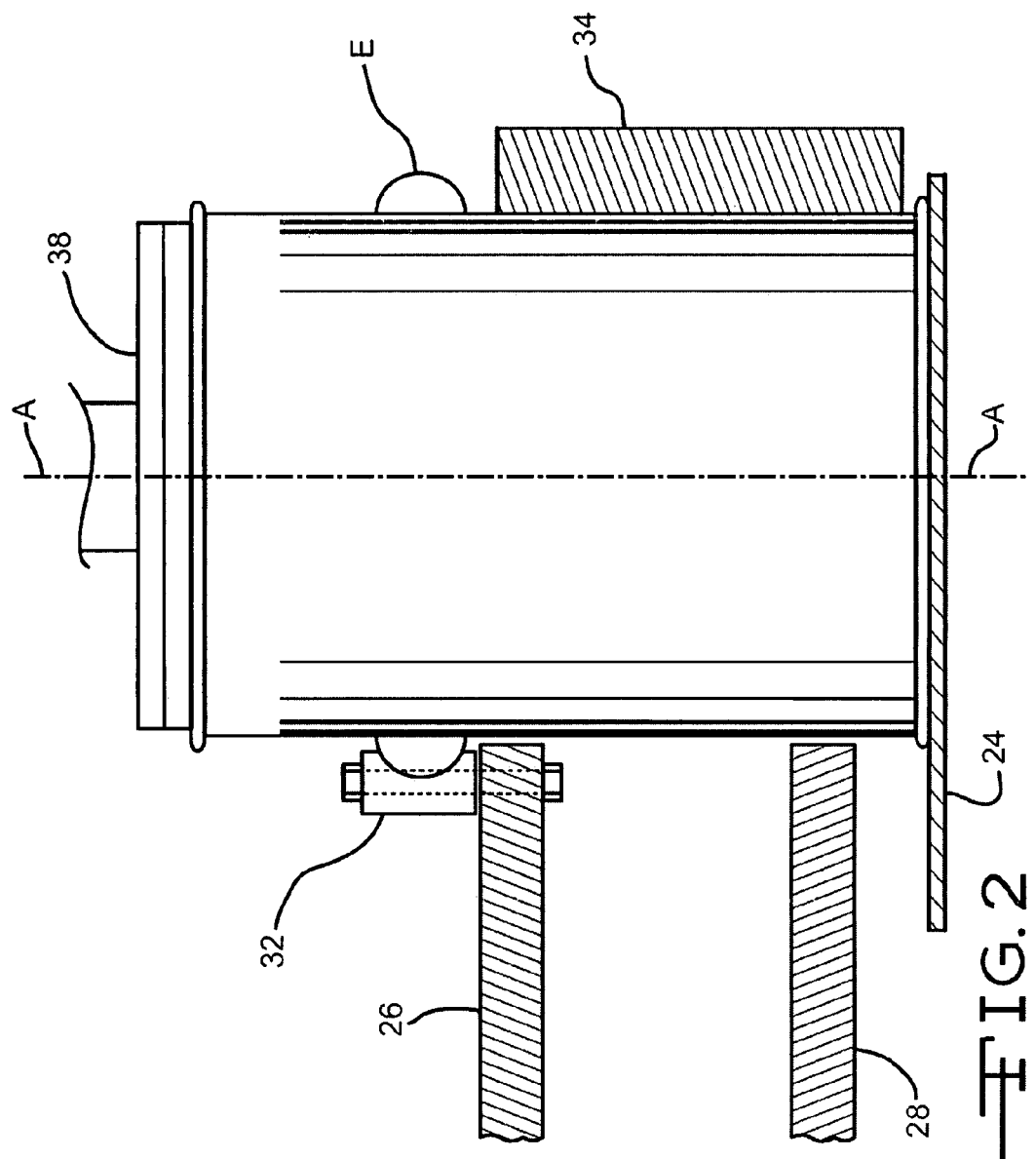
FIG. 2 is a partial cross-sectional view of the apparatus shown in FIG. 1, taken along the line 2-2 of FIG. 1.

Referring to FIG. 1, a container orienting label applicator station is indicated generally at 10. Labels 12 from a roll (not shown) are supplied to a label cutter station, indicated generally at 14, after passing through label guide rollers 16. Cut labels 18 are transferred from a rotary cutter 20 in the cutter station 14 to a vacuum label drum 22. Adhesive is applied to each label 18 by a glue roller 23. Containers C are advanced, from left to right in FIG. 1, on a conveyor belt 24 or some other conveyance. First, individual containers C enter successive pockets 25 defined by an upper star wheel 26 and a lower star wheel 28 (FIG. 2) which are rotated in the direction indicated by the arrow on the star wheel 26 (FIG. 1). As each container C exits one of the pockets 25 of the star wheels 26 and 28, it passes between the vacuum label drum 22 and a roll-on pad 30 where an individual label 18 is transferred from the label drum 22 to the container C. The labeled containers C then exit the label applicator station 10. This much of the label applicator station 10 illustrated in FIGS. 1 and 2 is largely conventional and will not be described further, except in the context of the container orienting features of the present invention.

The label applicator station 10 includes apparatus for orienting containers C. The containers C, as shown in the drawing, each have a pair of opposed ears E which may support a wire bail (not shown) in a known manner, as is the case with a conventional container known in some circles as a paint can. These containers typically have a one gallon capacity. The ears E on these containers C present some interesting challenges when it comes to applying a label to the containers. As is explained below, the present invention includes apparatus that will rotate an eared container to a predetermined angular orientation and deliver it into the labeling section of a label machine so that a label can be applied to the eared container. In one embodiment, the labels and the vacuum drum on which they are supported have openings that register with the ears when the label is applied to the container.

The container orienting apparatus includes a stop 32 associated with each pocket 25 and a roll pad 34 that cooperates with one of the pockets 25. The roll pad 34 has a surface 36 that is grippy in the sense that it is resilient and has a relatively high coefficient of friction. The grippy surface 36 is positioned so that a side wall of a container C carried in the pocket 25 that is closest to the roll pad 34 engages the surface 36 and, when the star wheels 26 and 28 are rotating, this engagement between the container C and the stationary grippy surface 36 causes the container C to rotate in the pocket 25 until such rotation brings an ear E of the container C into contact with the stop 32. At this point, the stop 32 resists further rotation of the container C to the extent that static friction between the side wall of the container C and the surface 36 is overcome and the container C stops rotating relative to the star wheel pocket 25 and begins rotating relative to the surface 36. The container C is now oriented for delivery to and engagement by and between the vacuum label drum 22 and the roll-on pad 30 so that the ears E will register with corresponding recesses in the face of the vacuum label drum and with corresponding recesses in the cut labels 18 supported on the vacuum label drum 22.

When an ear E on a container C in a pocket 25 strikes the stop 32 and the container begins to slide along the grippy surface 36 of the roll pad 34, the container will be subjected to a number of forces that will try to lift it out of and/or skew it within the pocket 25. To prevent this, a container retainer 38 (FIG. 2) is associated with each pocket 25. The retainer 38, preferably, is supported for reciprocating movement between an extended position as shown in FIG. 2 where it is operable to hold a container C against the conveyor 24 and a retracted position (not shown) in which it is inoperable to hold the container C against the conveyor 24. Each of the retainers 38 is preferably supported for reciprocating movement with a piston rod of a compressed air piston assembly associated with each pocket 25. An air switch operated, for example, by cam can be used to move the retainer 38 to the extended position and back again, in a desired timed sequence. It is preferred that the retainer 38 for a given pocket be extended into a first position just as, or immediately after, a container C enters the given pocket. It is also preferred that the retainer 38 remain in that position until and after the time that an ear E on the container C engages the stop 32 and until the container C moves past the grippy surface 36 of the roll pad 34 to a slippy surface 40 (FIG. 1) of the roll pad 34. At this instant, the retainer 38 is retracted and the container slides along the slippy surface 40, with an ear E abutted against the stop 32 until the container passes the slippy surface 40 and the container C is delivered to and engaged by and between the vacuum label drum 22 and the roll-on pad 30 so that the ears E will register with corresponding recesses 42 in the face of the vacuum label drum 22 and with corresponding recesses (not shown) in the cut labels 18 supported on the vacuum label drum 22.

It will be appreciated that the star wheels 26 and 28 are synchronized with the other components of the container orienting label applicator station 10 and, specifically, with the vacuum drum 22 and the label cutter 14. As a consequence, the leading edge of each pre-cut label 18 is applied to each container C at the same angular position relative to the star wheels 26 and 28 and to one of the ears E on the container C. The container orienting apparatus described above is operable to rotate each container C to position the ear E at a predetermined angular orientation relative to the star wheel pockets 25 and to maintain that orientation while the container C is delivered to the vacuum label drum 22.

During set-up of the apparatus 40, it may be determined that the containers C are being consistently rotated to the same angular orientation which is not the predetermined or desired angular orientation. In a preferred embodiment, as shown in FIG. 1, the stop 32 is mounted for sliding movement in a slot indicated at 44 in FIG. 3. A fastener 46 is operable to lock the stop 32 into a desired location along the slot 44 and, by varying the position of the stop 32, one can fine tune the angular orientation of the ear E elative to one of the star wheel pockets 25.

Referring now to FIG. 3, some details of the actuator for the container retainer 38 are shown. A linear actuator 48 (one for each star wheel pocket 25) is mounted on top of a lower, outer, actuator support ring 50 which is partially broken away. The container retainers 38 are mounted below the support ring 50, between it and the upper star wheel 26. Good results have been achieved with a linear actuator 48 that is retracted or extended under the influence of compressed air delivered through a hose 52 or a hose 54, respectively. Compressed air is selectively delivered to the actuator 48 through hose 52 or hose 54, according to the condition of an air valve 56 which is mounted on an inner, upper support ring 58. The support rings 50 and 58 are mounted together with the star wheels 26 and 28 for rotation together therewith about the central axis of the star wheels 26 and 28 and the support rings 50 and 58. The air valve 56 receives compressed air through a hose 62 which gets compressed air from a central post (not shown) through a rotating connector (not shown) and, when the valve 56 is in a first condition, it delivers compressed air through hose 52, causing the actuator 48 and the container retainer 38 to retract away from a container C in the corresponding pocket 25 of the star wheels 26 and 28. When the valve 56 is in a second condition, it delivers compressed air through hose 54, causing the actuator 48 and the container retainer 38 to extend towards a container C in the corresponding pocket 25 of the star wheels 26 and 28, to retain the container C in the star wheel pocket 25 and on the conveyor 24.

The condition of the valve 56 is determined by the angular position of the support ring 58 relative to a fixed cam plate 60 that is supported on a center cam support 62. A cam follower 64 is supported on a valve lever 66 which is pivotally mounted, as at 68, for movement between a first position, shown in FIG. 3, where it causes the valve 56 to deliver compressed air through the hose 52 to retract the associated container retainer 38 and a second position (not shown) in which the valve lever 66 has rotated counter clockwise about the pivot mount 68 from the position shown in FIG. 3 to a second position (not shown) in which it has depressed valve button 70. With the valve button 70 depressed, the valve 56 will direct compressed air to hose 54 causing the associated container retainer 38 to extend to a position where it will be operable to hold the associated container against the conveyor 24 and keep it in the pocket 25 of the star wheels 26 and 28. The cam follower 64 cooperates with the cam plate 60 and, specifically, a cam bump 72, to move the valve lever 66 from the first position to the second position. A spring (not shown) associated with the valve button 70 returns the valve lever 66 to the first position when the cam follower 64 clears the cam bump 72 as the support ring 58 rotates around the fixed, non-rotating cam plate 60.

Although the present invention has been described in terms of specific embodiments, it is anticipated that alterations and modifications thereof will no doubt become apparent to those skilled in the art. It is intended that the appended claims be interpreted as covering all such alterations and modifications as fall within the true spirit and scope of the invention.

What is claimed is:

1. A method for labeling a container having a side wall, a top and at least one ear extending outwardly from the container side wall, said method comprising the steps of
    advancing the container into a container orienting apparatus comprising
        at least one star wheel with at least one pocket,
        a stationary roll pad having a grippy surface,
        a container conveyor, and
        at least one stop for engaging the container ear,
    positioning the container within the star wheel pocket,
    rotating the container within the star wheel pocket by rotating that star wheel while there is static frictional engagement between the side wall of the container and the grippy surface of the stationary roll pad,
    extending a container retainer from a retracted position into engagement with the top of the container so that the container retainer presses the container down against the container conveyor when the container is in, or as it enters, the star wheel pocket,
    continuing to rotate the container until it is oriented to a desired rotational orientation and preventing further container rotation by engagement between the stop and the container ear so that static frictional engagement between the side wall of the oriented container and the grippy surface of the stationary roll pad is overcome, maintaining contact between the side wall of the oriented container and the grippy surface of the stationary roll pad while rotation of the oriented container is prevented, thereby generating forces that would lift the oriented container out of the star wheel pocket or skew the container in the star wheel pocket, overcoming those forces through the container retainer acting on the oriented container, rotating the star wheel and advancing the oriented container until it is no longer in contact with the grippy surface of the stationary roll pad, retracting the container retainer after the oriented container is no longer in contact with the grippy surface of the stationary roll pad, and applying a label to the oriented container after the container retainer is retracted.

2. The method claimed in claim 1 wherein the label is carried on a vacuum drum before it is applied to the oriented container.

3. The method claimed in claim 2 wherein the label has a hole, the vacuum drum has a recess, and the hole and the recess and the container ear register as the label is applied to the container.

4. The method claimed in claim 1 wherein the container conveyor comprises a conveyor belt and wherein the container retainer presses the container down against the conveyor belt.

5. The method claimed in claim 2 wherein the container conveyor comprises a conveyor belt and wherein the container retainer presses the container down against the conveyor belt.

6. The method claimed in claim 3 wherein the container conveyor comprises a conveyor belt and wherein the container retainer presses the container down against the conveyor belt.

* * * * *